(No Model.)
A. R. HALL.
Combined Ruler and Rotary Blotter.
No. 243,248. Patented June 21, 1881.
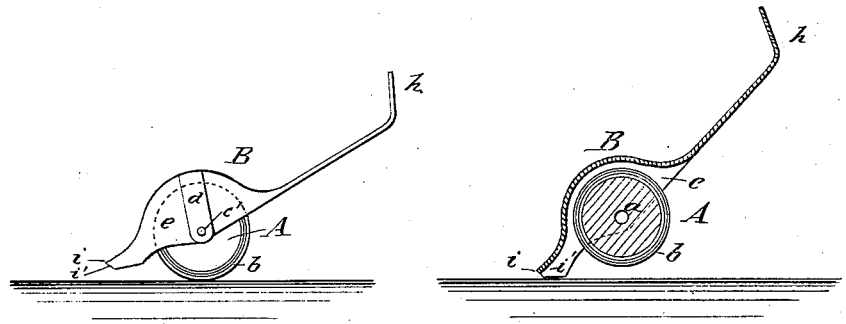
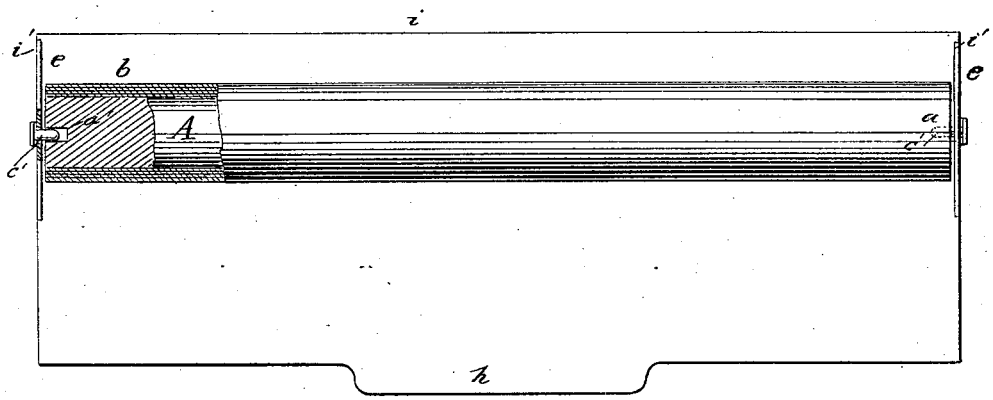
WITNESSES:
INVENTOR:
A. R. Hall
BY
ATTORNEYS.

UNITED STATES PATENT OFFICE.

ARTHUR R. HALL, OF PROMPTON, PENNSYLVANIA.

COMBINED RULER AND ROTARY BLOTTER.

SPECIFICATION forming part of Letters Patent No. 243,248, dated June 21, 1881.

Application filed April 14, 1881. (No model.)

*To all whom it may concern:*

Be it known that I, ARTHUR R. HALL, of Prompton, in the county of Wayne and State of Pennsylvania, have invented a new and Improved Combined Ruler and Rotary Blotter, of which the following is a full, clear, and exact description.

My invention relates to that well-known class of blotters which rotate within a case and are sometimes made with a paper-cutter in front and a ruler-strip on the rear of casing.

My invention consists in making the case of a strip of sheet metal extend in the rear to form a handle, and made with a straight-edge in front supported on two side flanges, as hereinafter described.

In the accompanying drawings, Figure 1 is a side elevation of my invention. Fig. 2 is a section thereof, showing the device in position for use as a ruler; and Fig. 3 is a bottom view, showing the roller partly in section.

Similar letters of reference indicate corresponding parts.

The roller A, which is preferably of wood and surrounded by the tube or layers of blotting material $b$, is formed with the holes $a$ $a'$ in its ends, by which it is journaled in the housing B by means of the pins, studs, or projections $c$ $c'$. The pin $c'$ is secured on the spring-plate $d$, by which means the roller can be removed from the housing and replaced when desired.

The housing B is preferably of sheet metal, and is of such size relative to the size of the roller that the side pieces, $e$ $e$, thereof will reach a little below the axis of the roller and permit the roller to revolve freely therein. The front edge, $i$, is straight and adapted to be used as a ruler. When used for this purpose the device should be brought to the position shown in Fig. 2, in which position the straight ends $i'$ $i'$ of the side pieces serve as a firm and steady support for the device. When the line or lines have been drawn the device is lowered to the position shown in Fig. 1 and the roller passed over the lines for blotting them. The extension $h$ of the casing serves as a handle for the device.

Instead of the housing shown in the drawings, it is obvious that a suitable frame might be used for holding the roller and not depart from the spirit of my invention; and instead of the roller it is obvious that a convex or similar blotting-pad might be used and still not depart from the spirit of my invention.

Having thus fully described my invention, I claim as new and desire to secure by Letters Patent—

The case of a rotary blotting-cylinder, made of sheet metal concaved and flanged to receive the roller or blotter cylinder, extended rearwardly to form a handle, and provided in front with a rule or straight-edge, $i$, supported on side flanges, $i'$ $i'$, as shown and described.

ARTHUR REEVE HALL.

Witnesses:
EGBERT M. KEENE,
DANIEL E. RUTAN.